United States Patent
Sharma

(10) Patent No.: US 12,330,454 B2
(45) Date of Patent: Jun. 17, 2025

(54) SYSTEM FOR AUTO-LOCATION OF TIRES EMPLOYING FOOTPRINT LENGTH

(71) Applicant: The Goodyear Tire & Rubber Company, Akron, OH (US)

(72) Inventor: Sparsh Sharma, Luxembourg (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 106 days.

(21) Appl. No.: 18/520,780

(22) Filed: Nov. 28, 2023

(65) Prior Publication Data
US 2024/0190188 A1 Jun. 13, 2024

Related U.S. Application Data

(60) Provisional application No. 63/387,157, filed on Dec. 13, 2022.

(51) Int. Cl.
*B60C 23/06* (2006.01)

(52) U.S. Cl.
CPC .................. *B60C 23/064* (2013.01)

(58) Field of Classification Search
CPC .................................... B60C 23/064
USPC ......................................... 340/443
See application file for complete search history.

(56) References Cited

U.S. PATENT DOCUMENTS

| | | | |
|---|---|---|---|
| 4,157,530 A | 6/1979 | Merz | |
| 4,361,202 A | 11/1982 | Minovitch | |
| 4,936,138 A | 6/1990 | Cushman et al. | |
| 6,434,399 B1 | 8/2002 | Kamperschroer | |
| 6,463,798 B2 | 10/2002 | Niekerk et al. | |
| 6,489,888 B1 | 12/2002 | Honeck et al. | |
| 6,725,712 B1 | 4/2004 | King et al. | |

(Continued)

FOREIGN PATENT DOCUMENTS

| | | |
|---|---|---|
| EP | 0494763 B1 | 5/1996 |
| EP | 2586633 A1 | 5/2013 |

(Continued)

OTHER PUBLICATIONS

Bonnie et al., Method and Device for determining the position of pressure sensors in a tire pressure monitoring system, Clarivate Analytics, 2008, 49 pages, 2008.

(Continued)

*Primary Examiner* — Zhen Y Wu
(74) *Attorney, Agent, or Firm* — Edward T. Kennedy

(57) ABSTRACT

An auto-location system includes a first tire sensor unit that measures a footprint length of a first tire. A second tire sensor unit measures a footprint length of a second tire. A vehicle status determination module receives the measured footprint lengths and determines when the vehicle is in a static or cruising state. A mean calculation module receives the measured footprint lengths when the vehicle is in a static or cruising state, and determines a first mean footprint length corresponding to the first sensor unit and a second mean footprint length corresponding to the second sensor unit. A comparison module receives the mean footprint lengths and determines a longest and a shortest of the mean footprint lengths. A position determination module generates a position determination of the first sensor unit and the second sensor unit based on the longest and the shortest of the mean footprint lengths.

20 Claims, 7 Drawing Sheets

(56) References Cited

U.S. PATENT DOCUMENTS

| | | |
|---|---|---|
| 6,750,761 B1 | 6/2004 | Newman |
| 6,879,252 B2 | 4/2005 | Dezorzi et al. |
| 6,885,282 B2 | 4/2005 | Desai et al. |
| 6,885,296 B2 | 4/2005 | Hardman et al. |
| 6,941,803 B2 | 9/2005 | Hirohama et al. |
| 6,952,160 B1 | 10/2005 | Bennie et al. |
| 7,010,968 B2 | 3/2006 | Stewart et al. |
| 7,131,323 B2 | 11/2006 | Hirota |
| 7,177,739 B2 | 2/2007 | Kuchler |
| 7,224,269 B2 * | 5/2007 | Miller ................. B60C 23/0408 340/444 |
| 7,355,509 B2 | 4/2008 | Rennie et al. |
| 7,367,227 B2 | 5/2008 | Stewart et al. |
| 7,385,485 B2 | 6/2008 | Thomas et al. |
| 7,423,532 B2 | 9/2008 | Stewart et al. |
| 7,425,892 B2 | 9/2008 | Mori et al. |
| 7,506,540 B1 * | 3/2009 | Job ..................... B60C 23/0416 340/447 |
| 7,750,798 B2 | 7/2010 | Mori |
| 7,839,273 B2 | 11/2010 | Tabe |
| 7,948,364 B2 | 5/2011 | Lin et al. |
| 8,035,502 B2 | 10/2011 | Heise |
| 8,188,848 B2 | 5/2012 | Lange et al. |
| 8,204,645 B2 | 6/2012 | Weston |
| 8,217,776 B2 | 7/2012 | Hyde |
| 8,332,103 B2 | 12/2012 | Greer et al. |
| 8,380,460 B2 | 2/2013 | Miller et al. |
| 8,396,629 B1 | 3/2013 | Kim et al. |
| 8,498,785 B2 | 7/2013 | Juzswik |
| 8,577,643 B2 | 11/2013 | Kuchler |
| 8,584,517 B2 | 11/2013 | Strahan |
| 8,626,413 B2 | 1/2014 | Kammann |
| 8,659,411 B2 | 2/2014 | Fink |
| 8,843,267 B2 | 9/2014 | Park et al. |
| 9,162,542 B2 | 10/2015 | Shima et al. |
| 9,180,742 B2 | 11/2015 | Kosugi et al. |
| 9,259,978 B2 | 2/2016 | Patel et al. |
| 9,278,589 B2 | 3/2016 | Laifenfeld et al. |
| 9,399,376 B2 | 7/2016 | Lickfelt et al. |
| 9,440,501 B2 | 9/2016 | Huang et al. |
| 9,463,673 B2 | 10/2016 | Huang et al. |
| 9,469,166 B2 | 10/2016 | Mcintyre et al. |
| 9,522,578 B1 * | 12/2016 | Singh ................. B60C 23/0416 |
| 9,584,881 B2 | 2/2017 | Taki |
| 9,769,305 B2 | 9/2017 | Banerjee et al. |
| 9,783,011 B2 | 10/2017 | Taki |
| 9,802,447 B2 | 10/2017 | Petrucelli |
| 9,851,227 B2 | 12/2017 | Lammers |
| 9,937,759 B2 | 4/2018 | Terada et al. |
| 9,950,577 B1 | 4/2018 | Marlett et al. |
| 9,973,831 B2 | 5/2018 | Mejegård et al. |
| 10,006,799 B2 | 6/2018 | Hanson et al. |
| 10,075,819 B2 | 9/2018 | Santavicca et al. |
| 10,081,317 B2 | 9/2018 | Naboulsi |
| 10,082,381 B2 | 9/2018 | McMillen |
| 10,093,138 B2 | 10/2018 | Decia et al. |
| 10,131,320 B2 | 11/2018 | Schmotzer et al. |
| 10,132,719 B2 | 11/2018 | Fudulea |
| 10,237,690 B2 | 3/2019 | Thakur et al. |
| 10,442,253 B2 | 10/2019 | Werner et al. |
| 10,479,300 B2 | 11/2019 | Wheeler et al. |
| 10,549,587 B2 | 2/2020 | Kollmitzer et al. |
| 10,685,510 B2 | 6/2020 | Linsmeier et al. |
| 10,726,714 B2 | 7/2020 | Sekizawa et al. |
| 10,780,749 B2 | 9/2020 | Hassani et al. |
| 11,034,196 B2 * | 6/2021 | Stewart ................. B60C 23/007 |
| 11,054,239 B2 * | 7/2021 | Kandler ................. G01M 17/02 |
| 2002/0092345 A1 | 7/2002 | Van et al. |
| 2004/0021562 A1 * | 2/2004 | Prenninger ......... B60C 23/0416 340/445 |
| 2005/0179530 A1 | 8/2005 | Stewart et al. |
| 2008/0143507 A1 | 6/2008 | Cotton et al. |
| 2008/0150712 A1 | 6/2008 | Cooprider et al. |
| 2009/0002146 A1 | 1/2009 | Lin |
| 2009/0066498 A1 | 3/2009 | Jongsma et al. |
| 2009/0299570 A1 | 12/2009 | Kammann |
| 2010/0063669 A1 | 3/2010 | Fink et al. |
| 2011/0071737 A1 | 3/2011 | Greer et al. |
| 2011/0282548 A1 | 11/2011 | Haas |
| 2011/0313623 A1 * | 12/2011 | Greer ................. B60C 23/0437 701/49 |
| 2012/0133498 A1 | 5/2012 | Nah et al. |
| 2013/0207796 A1 * | 8/2013 | Stewart ............... B60C 23/0489 340/438 |
| 2014/0002257 A1 | 1/2014 | Han et al. |
| 2014/0007683 A1 * | 1/2014 | Guinart ................. B60C 23/064 73/514.02 |
| 2014/0379231 A1 | 12/2014 | Hawes et al. |
| 2016/0039365 A1 | 2/2016 | Vanderwall |
| 2016/0129736 A1 | 5/2016 | Peine et al. |
| 2017/0106706 A1 | 4/2017 | Bettecken et al. |
| 2017/0174014 A1 | 6/2017 | Stewart et al. |
| 2017/0355234 A1 * | 12/2017 | Dharamshi ......... B60C 23/0408 |
| 2018/0074490 A1 | 3/2018 | Park |
| 2019/0126694 A1 * | 5/2019 | Stewart ............... B60C 23/0461 |
| 2019/0244301 A1 | 8/2019 | Seth et al. |
| 2020/0101802 A1 | 4/2020 | Nasser et al. |
| 2020/0346500 A1 | 11/2020 | Zeng et al. |
| 2020/0369100 A1 * | 11/2020 | Pierre ................. B60C 23/0474 |
| 2020/0384815 A1 * | 12/2020 | Adler ..................... H04W 4/48 |
| 2020/0398617 A1 | 12/2020 | Kandler et al. |
| 2021/0061020 A1 * | 3/2021 | Singh .................... B60C 11/243 |
| 2022/0176968 A1 | 6/2022 | Brooks |
| 2022/0230481 A1 | 7/2022 | Singh et al. |

FOREIGN PATENT DOCUMENTS

| | | |
|---|---|---|
| WO | 2002057097 A3 | 7/2002 |
| WO | 2006100577 A1 | 9/2006 |
| WO | 2006104484 A1 | 10/2006 |
| WO | 2008116683 A1 | 10/2008 |
| WO | 2013139977 A1 | 9/2013 |
| WO | 2017018700 A1 | 2/2017 |
| WO | 2019092052 A1 | 5/2019 |
| WO | 2019243374 A1 | 12/2019 |
| WO | 2020053901 A1 | 3/2020 |
| WO | 2020123812 A1 | 6/2020 |

OTHER PUBLICATIONS

Search Report for EP23215332 dated Apr. 26, 2024.

\* cited by examiner

SYSTEM FOR AUTO-LOCATION OF TIRES EMPLOYING FOOTPRINT LENGTH

FIELD OF THE INVENTION

The invention relates generally to tire monitoring systems. More particularly, the invention relates to systems that include sensors mounted on vehicle tires to measure tire parameters. Specifically, the invention is directed to a system for locating the position of a tire on a vehicle that employs a footprint length of the tire, which is measured by a sensor mounted on the tire.

BACKGROUND OF THE INVENTION

Sensors have been mounted on vehicle tires to monitor certain tire parameters, such as pressure and temperature. Systems that include sensors which monitor tire pressure are often known in the art as tire pressure monitoring systems (TPMS). For example, a tire may have a TPMS sensor that transmits a pressure signal to a processor, which generates a low pressure warning when the pressure of the tire falls below a predetermined threshold. It is desirable that systems including pressure sensors be capable of identifying the tire that is experiencing low air pressure, rather than merely alerting the vehicle operator or a fleet manager that one of the vehicle tires is low in pressure.

The process of identifying which sensor sent a particular signal and, therefore, which tire may have low pressure, is referred to as auto-location or localization. Effective and efficient auto-location or localization is a challenge in TPMS, as tires may be replaced, rotated, and/or changed between summer and winter tires, altering the position of each tire on the vehicle. Additionally, power constraints typically make frequent sensor communications and auto-location or localization of signal transmissions impractical.

Prior art techniques to achieve signal auto-location or localization have included various approaches. For example, low frequency (LF) transmitters have been installed in the vicinity of each tire, two-axis acceleration sensors have been employed to recognize a rotation direction of the tire for left or right tire location determination, and methods distinguishing front tires from rear tires using radio frequency (RF) signal strength have been used. The prior art techniques have deficiencies that make location of a sensor mounted in a tire on a vehicle either expensive or susceptible to inaccuracies. In addition, some prior art techniques may be undesirably complex and/or difficult to execute.

As a result, there is a need in the art for a system that provides economical and accurate identification of the location of a position of a tire on a vehicle.

SUMMARY OF THE INVENTION

According to an aspect of an exemplary embodiment of the invention, an auto-location system for locating a position of a tire supporting a vehicle is provided. The system includes a first tire sensor unit mounted on a first tire, in which the first tire sensor unit includes a first footprint length measurement sensor to measure a length of a footprint of the first tire and electronic memory capacity to store an identification of the first tire sensor unit. A second tire sensor unit is mounted on a second tire, in which the second tire sensor unit includes a second footprint length measurement sensor to measure a length of a footprint of the second tire and electronic memory capacity to store an identification of the second tire sensor unit. A processor is in electronic communication with the first and second tire sensor units. A vehicle status determination module is in electric communication with the processor, receives the measured footprint length of the first tire and the measured footprint length of the second tire, and determines when the vehicle is in a static state or a cruising state. A mean calculation module is in electric communication with the processor, receives the measured footprint length of the first tire and the measured footprint length of the second tire from the vehicle status determination module when the vehicle is in a static state or a cruising state, and determines a first mean footprint length that corresponds to the first tire sensor unit and a second mean footprint length that corresponds to the second tire sensor unit. A comparison module is in electric communication with the processor, receives the first mean footprint length and the second mean footprint length, and determines a longest and a shortest of the first mean footprint length and the second mean footprint length. A position determination module is in electric communication with the processor and generates a position determination of the first tire sensor unit and the second tire sensor unit based on the longest and the shortest of the first mean footprint length and the second mean footprint length.

BRIEF DESCRIPTION OF THE DRAWINGS

The invention will be described by way of example and with reference to the accompanying drawings, in which.

Similar numerals refer to similar parts throughout the drawings.

Definitions

"ANN" or "artificial neural network" is an adaptive tool for non-linear statistical data modeling that changes its structure based on external or internal information that flows through a network during a learning phase, used to model complex relationships between inputs and outputs or to find patterns in data.

"Axial" and "axially" means lines or directions that are parallel to the axis of rotation of the tire.

"CAN bus" or "CAN bus system" is an abbreviation for controller area network system, which is a vehicle bus standard designed to allow microcontrollers and devices to communicate with each other within a vehicle without a host computer.

"Circumferential" means lines or directions extending along the perimeter of the surface of the annular tread perpendicular to the axial direction.

"Equatorial centerplane" means the plane perpendicular to the tire's axis of rotation and passing through the center of the tread.

"Footprint" means the contact patch or area of contact created by the tire tread with a flat surface as the tire rotates or rolls.

"Groove" is a continuous channel molded or cut into the tread.

"Inboard side" means the side of the tire nearest the vehicle when the tire is mounted on a wheel and the wheel is mounted on the vehicle.

"Lateral" means an axial direction.

"Outboard side" means the side of the tire farthest away from the vehicle when the tire is mounted on a wheel and the wheel is mounted on the vehicle.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Tread" is the portion of the tire that comes into contact with the road.

"Tread depth" is the radial distance measured from the tread surface to the bottom of the grooves.

"Tread element" means a rib or a block element defined by a shape having adjacent grooves.

DETAILED DESCRIPTION OF THE INVENTION

Figure 1:
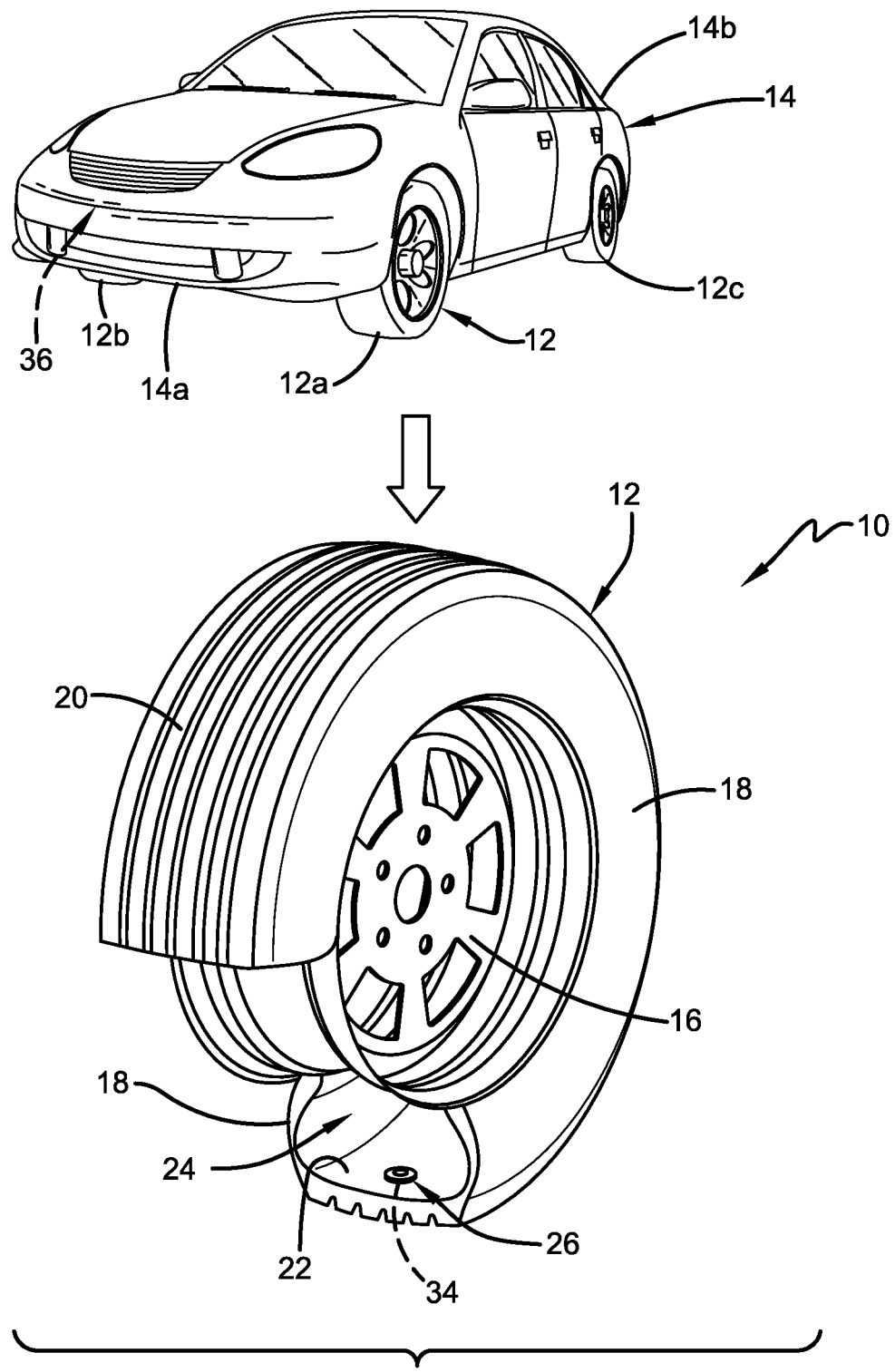
FIG. 1 is a schematic perspective view of a vehicle that includes tires employing an exemplary embodiment of the auto-location system of the present invention.

With reference to FIGS. 1 through 7, an exemplary embodiment of an auto-location system of the present invention is indicated at 10. With particular reference to FIG. 1, the system 10 locates the position of each tire 12 supporting a vehicle 14. The vehicle includes a front end 14a and a rear end 14b. The position of each tire 12 on the vehicle 14 shall be referred to herein by way of example as front left position 12a, front right position 12b, rear left position 12c, and rear right position 12d. While the vehicle 14 is depicted as a passenger car, the invention is not to be so restricted. The principles of the invention find application in other vehicle categories, such as commercial trucks, off-the-road vehicles, and the like, in which vehicles may be supported by more or fewer tires than those shown in FIG. 1.

The tires 12 are of conventional construction, and each tire is mounted on a respective wheel 16 as known to those skilled in the art. Each tire 12 includes a pair of sidewalls 18 that extend to a circumferential tread 20. An innerliner 22 is disposed on the inner surface of the tire 12, and when the tire is mounted on the wheel 16, an internal cavity 24 is formed, which is filled with a pressurized fluid, such as air.

A tire sensor unit 26 is attached to the innerliner 22 of each tire 12 by means such as an adhesive, and measures certain parameters or conditions of the tire as will be described in greater detail below. It is to be understood that the tire sensor unit 26 may be attached in such a manner, or to other components of the tire 12, such as on or in one of the sidewalls 18, on or in the tread 20, on the wheel 16, and/or a combination thereof. For the purpose of convenience, reference herein shall be made to mounting of the tire sensor unit 26 on the tire 12, with the understanding that such mounting includes all such types of attachment.

The tire sensor unit 26 is mounted on each tire 12 for the purpose of detecting certain real-time tire parameters, such as tire pressure 38 (FIG. 5) and/or tire temperature. For this reason, the tire sensor unit 26 preferably includes a pressure sensor and a temperature sensor, and may be of any known configuration. The tire sensor unit 26 may be referred to as a tire pressure monitoring system (TPMS) sensor. The tire sensor unit 26 preferably also includes electronic memory capacity for storing identification (ID) information for the tire sensor unit, known as a sensor ID 34, which includes a unique identifying number or code for each tire sensor unit. In the art, the phrase tire ID is sometimes used interchangeably with sensor ID 34, and reference herein shall be made to sensor ID for the purpose of convenience.

Figure 2:
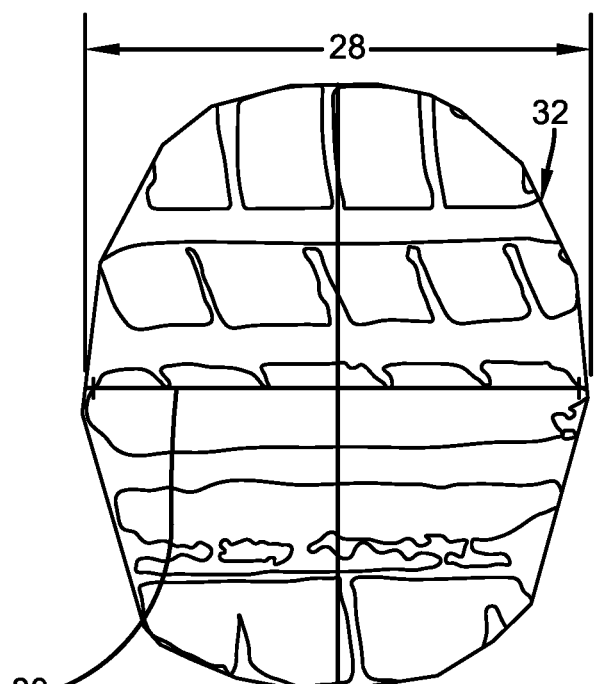
FIG. 2 is a schematic plan view of a footprint of a tire shown in FIG. 1.

With additional reference to FIG. 2, the tire sensor unit 26 preferably also measures a length 28 of a centerline 30 of a footprint 32 of the tire 12. More particularly, as the tire 12 contacts the ground, the area of contact created by the tread 20 with the ground is known as the footprint 32. The centerline 30 of the footprint 32 corresponds to the equatorial centerplane of the tire 12, which is the plane that is perpendicular to the axis of rotation of the tire and which passes through the center of the tread 20. The tire sensor unit 26 thus measures the length of the centerline 30 of the tire footprint 32, which is referred to herein as the measured footprint length 28.

Figure 4:
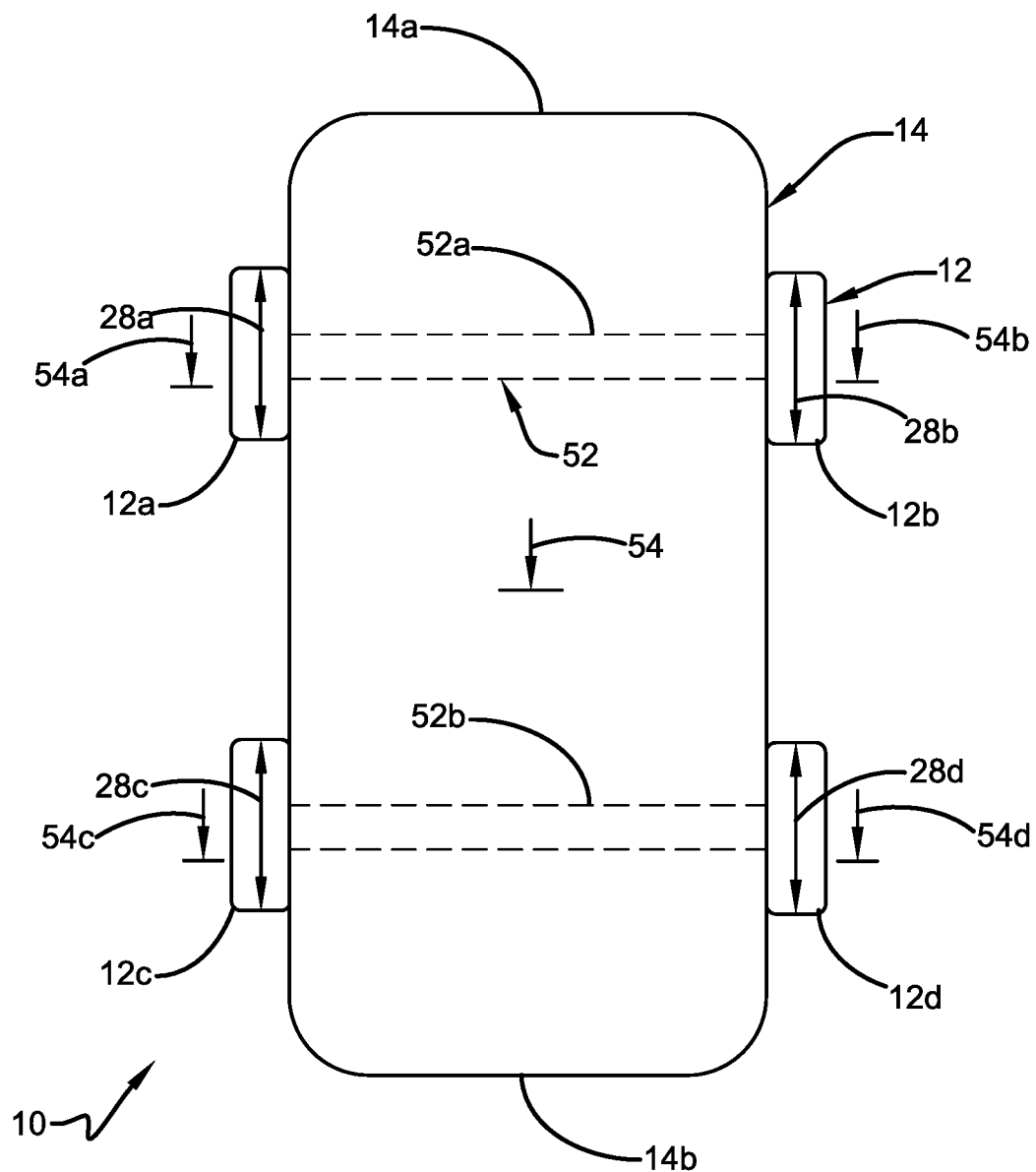
FIG. 4 is a schematic plan view representation of the vehicle shown in FIG. 1.

With additional reference to FIG. 4, the front left tire position 12a includes a front left measured footprint length 28a, the front right tire position 12b includes a front right measured footprint length 28b, the rear left tire position 12c includes a rear left measured footprint length 28c, and the rear right tire position 12d includes a rear right measured footprint length 28d. Any suitable technique for measuring the measured footprint length 28 may be employed by the tire sensor unit 26. For example, the tire sensor unit 26 may include a strain sensor or piezoelectric sensor that measures deformation of the tread 20 and thus indicates the measured footprint length 28. Preferably, each measured footprint length 28 is associated with the sensor ID 34 of the particular tire sensor unit 26 that obtained the measured footprint length.

Figure 3:
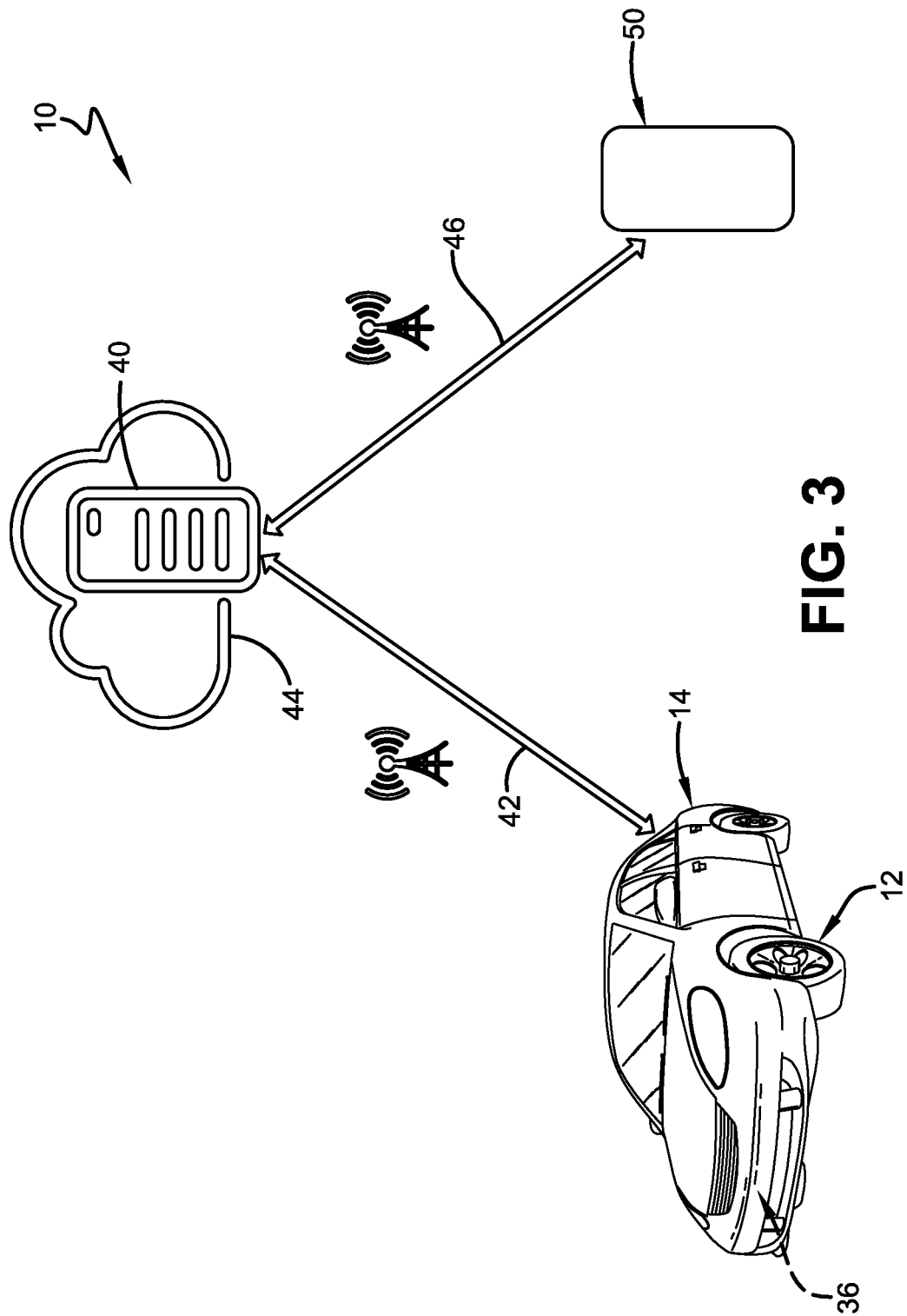
FIG. 3 is a schematic representation of data transmission to a cloud-based server and to a display device.

Turning to FIG. 3, aspects of the auto-location system 10 preferably are executed on a processor 40. The processor 40 enables input of parameters and execution of specific techniques, to be described below, which are stored in a suitable storage medium and are in electronic communication with the processor. The processor 40 may be mounted on the vehicle 14, may be in communication with an electronic control system 36 of the vehicle, such as the vehicle CAN bus system, and/or may be a remote processor in a cloud-based server 44.

The tire sensor unit 26 (FIG. 1) preferably includes wireless transmission means 42, such as an antenna, for wirelessly sending the measured footprint length 28 and the sensor ID 34 to the processor 40. Output from the auto-location system 10 may be wirelessly transmitted by an antenna 46 from the processor 40 to a display or controller device 50. By way of example, the device 50 may include a display device that is accessible to a user of the vehicle 14 or a technician for the vehicle, such as a smartphone, and/or a device that is accessible to a fleet manager, such as a computer. Output from the auto-location system 10 may also be wirelessly transmitted from the processor 40 to the electronic control system 36 of the vehicle 14.

Turning to FIG. 4, the auto-location system 10 of the present invention employs a relationship between the footprint 32 of each tire 12 and a front-to-rear load distribution of the vehicle 14. More particularly, the vehicle 14 typically has an uneven front-to-rear static weight distribution, which may be primarily attributed to the weight of heavy powertrain and drivetrain components, such as the engine, transmission, driveshafts, and the like. As is known in the art, each tire 12 is rotatably mounted on a respective axle 52. For example, each one of the front tires 12a and 12b are mounted on a respective end of a front axle 52a, and each one of the rear tires 12c and 12d is mounted on a respective end of a rear axle 52b.

In many cases, the engine is mounted at the front 14a of the vehicle 14, which results in the front axle 52a being more heavily loaded than the rear axle 52b. The configuration of one axle 52, such as the front axle 52a, being more heavily loaded than another axle, such as the rear axle 52b, is employed by the system 10. It is to be understood that the front axle 52a being more heavily loaded than the rear axle 52b is discussed herein by way of example. The system 10 may employ a relationship in which the rear axle 52b is more heavily loaded than the front axle 52a without affecting the overall concept or operation of the invention.

A total load of the vehicle 14, indicated at 54, which is effectively the sum of loads that are supported by each tire 12, is related to the measured footprint length 28 of each tire. When observed at each tire 12, a front left load 54a, which is the load on the front left tire 12a, is related to the front left measured footprint length 28a. A front right load 54b, which is the load on the front right tire 12b, is related to the front right measured footprint length 28b. A rear left load 54c, which is the load on the rear left tire 12c, is related to the rear left measured footprint length 28c. A rear right load 54b, which is the load on the rear right tire 12d, is related to the rear right measured footprint length 28d.

The relationship between the load supported at each tire 12 and the corresponding measured footprint length 28 is proportional. As a result, when the rear 14b of an empty vehicle 14 is loaded, the load on the rear axle 52b increases, and the measured footprint length 28 of each of the rear tires 12c and 12d increases. Likewise, when the front 14a of a vehicle 14 is loaded, the load on the front axle 52a increases, and the measured footprint length 28 of each of the front tires 12 and 12b increases. The auto-location system 10 of the present invention preferably employs the principles of that relationship between the load supported at each tire 12 and the corresponding measured footprint length 28 are proportional, and that one axle 52, such as the front axle 52a, is more heavily loaded than the other axle, such as the rear axle 52b.

Figure 5:
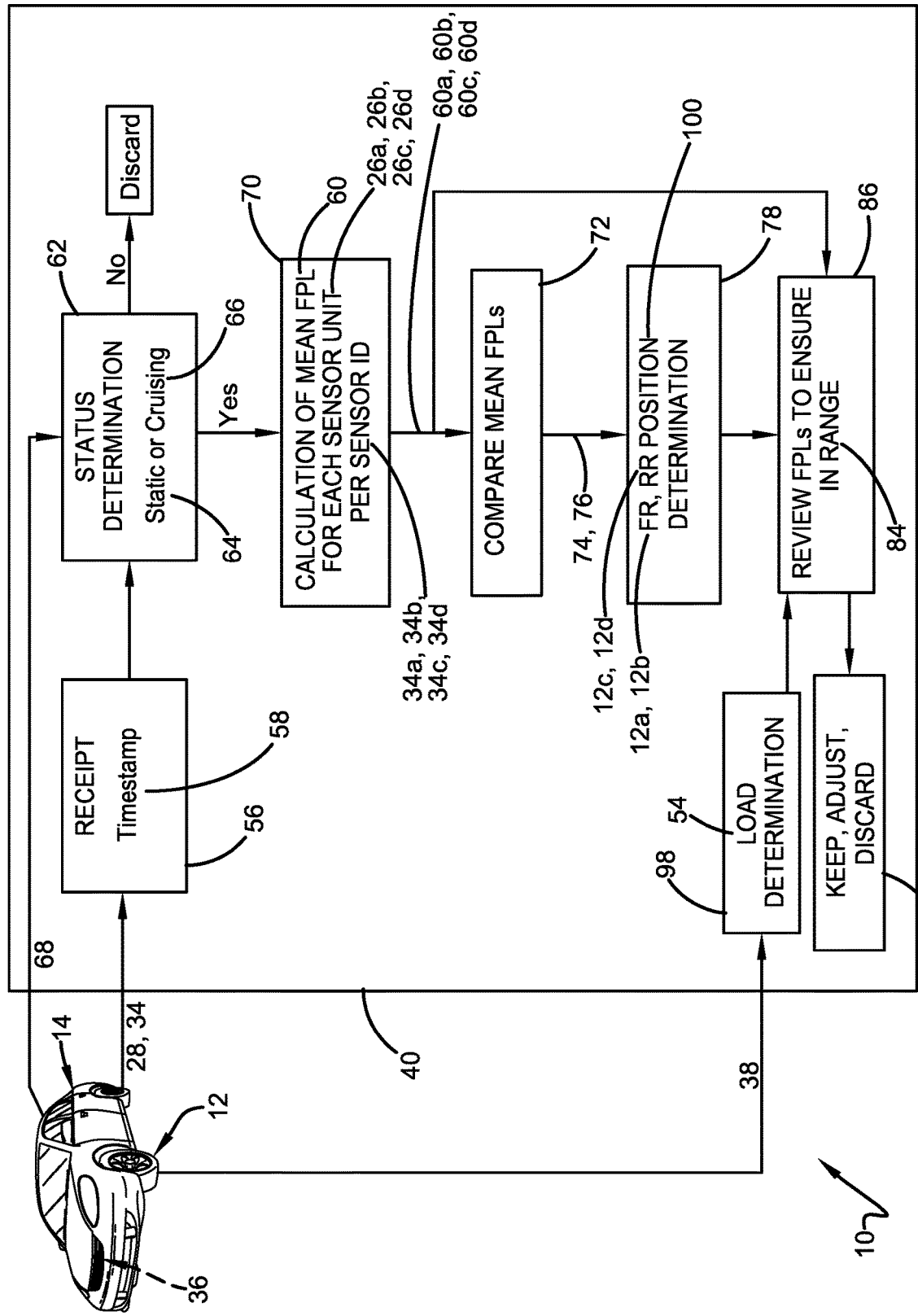
FIG. 5 is a schematic diagram of aspects of an exemplary embodiment of the auto-location system of the present invention.

Referring to FIG. 5, in the auto-location system 10, each tire sensor unit 26 communicates a respective measured footprint length 28 and the sensor ID 34 to the processor 40. A receipt module 56 is in stored on or is otherwise in electric communication with the processor 40, and receives the measured footprint length 28 and the sensor ID 34. The receipt module 56 preferably receives and correlates multiple communications of the measured footprint length 28 and the sensor ID 34. Preferably, each communication receives a timestamp 58, which is a digital identification of the time at which each respective measured footprint length 28 and the sensor ID 34 is communicated, transmitted, or recorded.

A mean footprint length 60 is determined from footprint length measurements 28 for each sensor ID 34. To ensure optimum accuracy and integrity of the mean footprint length 60 determination, the measured footprint lengths 28 are communicated to a vehicle status determination module 62. The vehicle status determination module 62 is in stored on or is otherwise in electric communication with the processor 40, and ensures that measured footprint lengths 28 are employed only for instances in which the vehicle 14 is in a steady state, including a static or stationary state 64 or in a cruising state 66. The cruising state 66 is when the vehicle 14 is operating at a steady speed in a straight line, with minimal cornering or turning, minimal acceleration, and minimal deceleration or braking.

The vehicle status determination module 62 reduces the use of measurements from instances that may interfere with accurate steady-state measure footprint lengths 28 to optimize the accuracy of the system 10. More particularly, cornering or turning of the vehicle results in a lateral load transfer, while acceleration and deceleration result in longitudinal load transfer. Such lateral and longitudinal load transfer may affect the measured footprint length 28 of each tire 12, which in turn may undesirably interfere with the principles that the relationship between the load supported at each tire 12 and the corresponding measured footprint length 28 are proportional, and that the front axle 52a is more heavily loaded than the rear axle 52b.

The vehicle status determination module 62 may receive a vehicle signal 68, such as a vehicle speed or acceleration, which may be communicated or transmitted to the processor 40 from a vehicle control system 36, such as the CAN bus, or directly from a speedometer, accelerometer, or similar sensor. When the vehicle signal 68 indicates that the vehicle 14 is in a static state 64, and thus at zero speed, or in a cruising state 66, and thus at minimal acceleration or deceleration, the vehicle status determination module 62 communicates the measured footprint lengths 28 to a mean calculation module 70.

The mean calculation module 70 is in stored on or is otherwise in electric communication with the processor 40. The mean calculation module 70 may receive one set of measured footprint lengths 28 or multiple sets of measured footprint lengths for each tire sensor unit 26 as identified by each sensor ID 34. By way of example, the vehicle 14 may include four (4) tires 12, each one of which includes a tire sensor unit 26. Thus, a first tire sensor unit 26a includes a respective first sensor ID 34a, a second tire sensor unit 26b includes a respective second sensor ID 34b, a third tire sensor unit 26c includes a respective third sensor ID 34c, and a fourth tire sensor unit 26d includes a respective fourth sensor ID 34d. The mean calculation module 70 receives one or more sets of measured footprint lengths 28 for the first tire sensor unit 26a, the second tire sensor unit 26b, the third tire sensor unit 26c, and the fourth tire sensor unit 26d.

The mean calculation module 70 determines the mean footprint length 60 from the measured footprint lengths 28. Because the mean calculation module 70 receives at least one set of measured footprint lengths 28 for each tire sensor unit 26, a mean footprint length 60 is determined for each tire sensor unit. Thus, a first mean footprint length 60a is determined for the first tire sensor unit 26a according to the first sensor ID 34a, a second mean footprint length 60b is determined for the second tire sensor unit 26b according to the second sensor ID 34b, a third mean footprint length 60c is determined for the third tire sensor unit 26c according to the third sensor ID 34c, and a fourth mean footprint length 60d is determined for the fourth tire sensor unit 26d, according to the fourth sensor ID 34d.

The first mean footprint length 60a, second mean footprint length 60b, third mean footprint length 60c, and fourth mean footprint length 60d are communicated to a comparison module 72, which is in stored on or is otherwise in electric communication with the processor 40. The comparison module 72 compares the mean footprint lengths 60a, 60b, 60c, 60d to determine a longest, and preferably longest pair 74, of mean footprint lengths. The comparison module 72 also compares the mean footprint lengths 60a, 60b, 60c, 60d to determine a shortest, and preferably shortest pair 76, of mean footprint lengths. With additional reference to FIG. 6, in this example, the first mean footprint length 60a and the second mean footprint length 60b are the longest two footprint lengths and thus constitute the longest pair 74. The third mean footprint length 60c and the fourth mean footprint length 60d are the shortest two footprint lengths and thus constitute the shortest pair 76.

The longest pair 74 of mean footprint lengths and the shortest pair 76 of mean footprint lengths are communicated from the comparison module 72 to a position determination module 78, which is in stored on or is otherwise in electric communication with the processor 40 and generates a position determination 100. The position determination module 78 applies the principles of the measured footprint length 28 being proportional to the load 54a, 54b, 54c, 54d at each tire 12, and the front axle 52a being more heavily loaded than the rear axle 52b, to generate the position determination 100. According to these principles, the longest pair 74 of mean footprint lengths and the shortest pair 76 of mean footprint lengths may be used to designate tire positions and generate the position determination 100.

More particularly, the longest pair 74, which are the first mean footprint length 60a and the second mean footprint length 60b in this example, are designated in the position determination module 78 as the front tire positions 12a, 12b. The shortest pair 76, which are the third mean footprint length 60c and the fourth mean footprint length 60d in this example, are designated in the position determination module 78 as the rear tire positions 12c, 12d. Because the tire sensor unit 26 for each mean footprint length 60 is known based on the sensor ID 34 as described above, the position determination module 78 may assign each sensor unit to a respective position.

In this example, because the first mean footprint length 60a corresponds to the first tire sensor unit 26a and the second mean footprint length 60b corresponds to the second tire sensor unit 26b, the first and second sensor units are determined to be at the front tire positions 12a, 12b. In addition, because the third mean footprint length 60c corresponds to the third tire sensor unit 26c and the fourth mean footprint length 60d corresponds to the fourth tire sensor unit 26d, the third and fourth sensor units are determined to be at the rear tire positions 12c, 12d. Thus, in this example, the position determination 100 generated by the position determination module 78 is that the first and second tire sensor units 26a, 26b are at the front tire positions 12a, 12b, and the third and fourth tire sensor units 26c, 26d are at the rear tire positions 12c, 12d.

Figure 6:
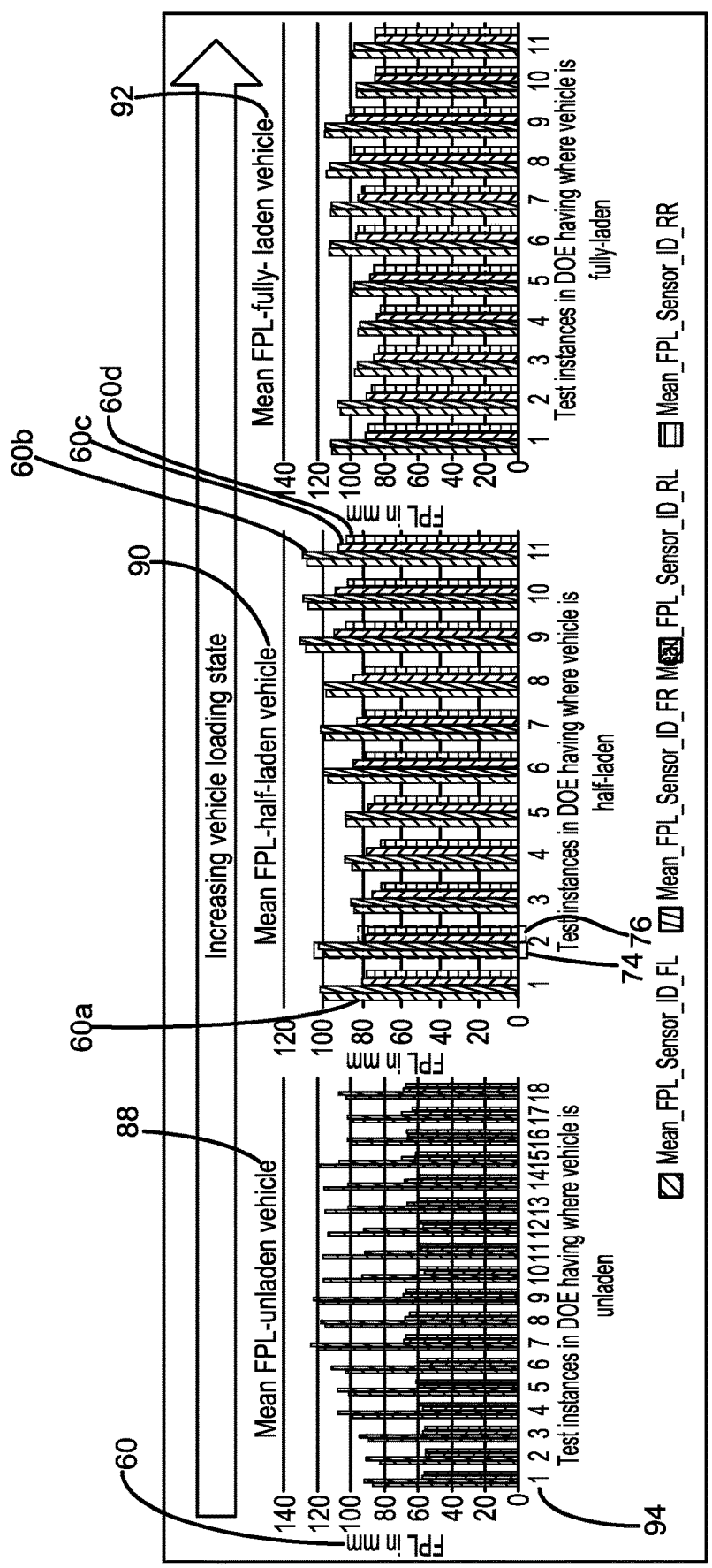
FIG. 6 is a graphical representation of another aspect of the auto-location system shown in FIG. 5.

As shown in FIG. 6, when the vehicle 14 is a front-wheel drive vehicle with the front axle 52a being more heavily loaded than the rear axle 52b, the technique executed by the system 10 applies to different loading states of the vehicle. Mean footprint lengths 60 were generated in multiple iterations 94 for different vehicle loading states. For example, an unladen state of the vehicle 14 is indicated at 88, a half-laden state of the vehicle is indicated at 90, and a fully laden state of the vehicle is indicated at 92. The first, second, third, and fourth mean footprint lengths 60a, 60b, 60c, and 60d in each iteration were grouped together per vehicle 14. The mean footprint lengths 60 were also measured at different tire pressures 38 for each tire 12, including settings at a recommended pressure level, at about 15 to 20 percent (%) below the recommended pressure level, and at about 15 to 20% above the recommended pressure level.

In each instance, the longest pair 74, which are the first mean footprint length 60a and the second mean footprint length 60b, correspond to the front tire positions 12a, 12b. In addition, the shortest pair 76, which are the third mean footprint length 60c and the fourth mean footprint length 60d, correspond to the rear tire positions 12c, 12d. Thus, the position determination 100 of the auto-location system 10 applies across most typical or standard vehicle loading state and tire pressure setting combinations.

Returning to FIG. 5, the auto-location system 10 includes an optional range review module 86 to ensure the integrity of the position determination 100 by screening for atypical conditions. The range review module 86 is in stored on or is otherwise in electric communication with the processor 40. With additional reference to FIG. 7, the tire pressure 38 and tire load 54a, 54b, 54c, 54d impact the measured footprint length 28 of each tire 12, as shown by a tire pressure loading state 82.

More particularly, the tire pressure 38 has an inverse relationship with the measured footprint length 28, so that as the pressure increases, the measured footprint length decreases. In addition, the tire load 54a, 54b, 54c, 54d has a proportional relationship with the measured footprint length 28, so that as the tire load increases, the measured footprint length increases. A sensitivity 80 of the measured footprint length 28 to a change in tire pressure 38 is dependent on the vehicle load 54 and the corresponding tire load 54a, 54b, 54c, 54d. Thus, at a higher load 54a, 54b, 54c, 54d, the sensitivity 80 of the measured footprint length 28 to a change in tire pressure 38 is higher.

Based on this, the tire pressure loading state 82 of each tire 12 may be employed to determine an acceptable range of measured footprint lengths 28 for the front tires 12a, 12b and an acceptable range of measured footprint lengths for the rear tires 12c, 12d. When an exceptional circumstance exists, such as the tires 12 being at a very low pressure or a very high pressure in combination with a high vehicle load 54, the measured footprint lengths 28 may result in mean footprint lengths 60 that are outside of an acceptably range and may thus be inaccurate.

To ensure the integrity of the system 10 under such atypical conditions, the range review module 86 may include a predetermined range 84 to verify the vehicle condition. For example, the range 84 may be a predetermined range of measured footprint lengths 28 and/or mean footprint lengths 60 for the front tires 12a, 12b and a predetermined range of measured footprint lengths and/or mean footprint lengths for the rear tires 12c, 12d. When values for the measured footprint lengths 28 and/or the mean footprint lengths 60 are inside the range, a decision 96 may be made to keep the above-described position determination 100. When values for the measured footprint lengths 28 and/or the mean footprint lengths 60 are outside the range, the decision 96 may be made to discard the position determination 100.

The range 84 employed by the range review module 86 may alternatively be a predetermined range of load 54 of the vehicle 14. For example, when the value for the load 54 of the vehicle 14 is inside the range, the decision 96 may be made to keep the above-described position determination 100. When the value for the load 54 of the vehicle 14 is outside the range, such as when the load is excessive, the decision 96 may be made to discard the position determination 100. Alternatively, when the value for the load 54 of the vehicle 14 is outside of the range, but is consistent with a known heavy-loading condition, the decision 96 may be to change the above-described position determination 100 and assign the front tire positions 12a, 12b to the shortest pair 76 of mean footprint lengths 60, and assign the rear tire positions 12c, 12d to the longest pair 74 of mean footprint lengths.

In order to compare the real-time load 54 of the vehicle 14 to the predetermined range 84, various load estimation techniques may be employed by a load determination module 98, which may receive the tire pressure 38 from the tire sensor unit 26 as an input. Exemplary load estimation techniques are described in U.S. Pat. Nos. 11,298,991; 10,245,906; 9,874,496; 9,222,854; 9,120,356; and 8,844,346, all of which are owned by the same assignee as the present invention, The Goodyear Tire & Rubber Company, and are incorporated herein by reference.

Figure 7:
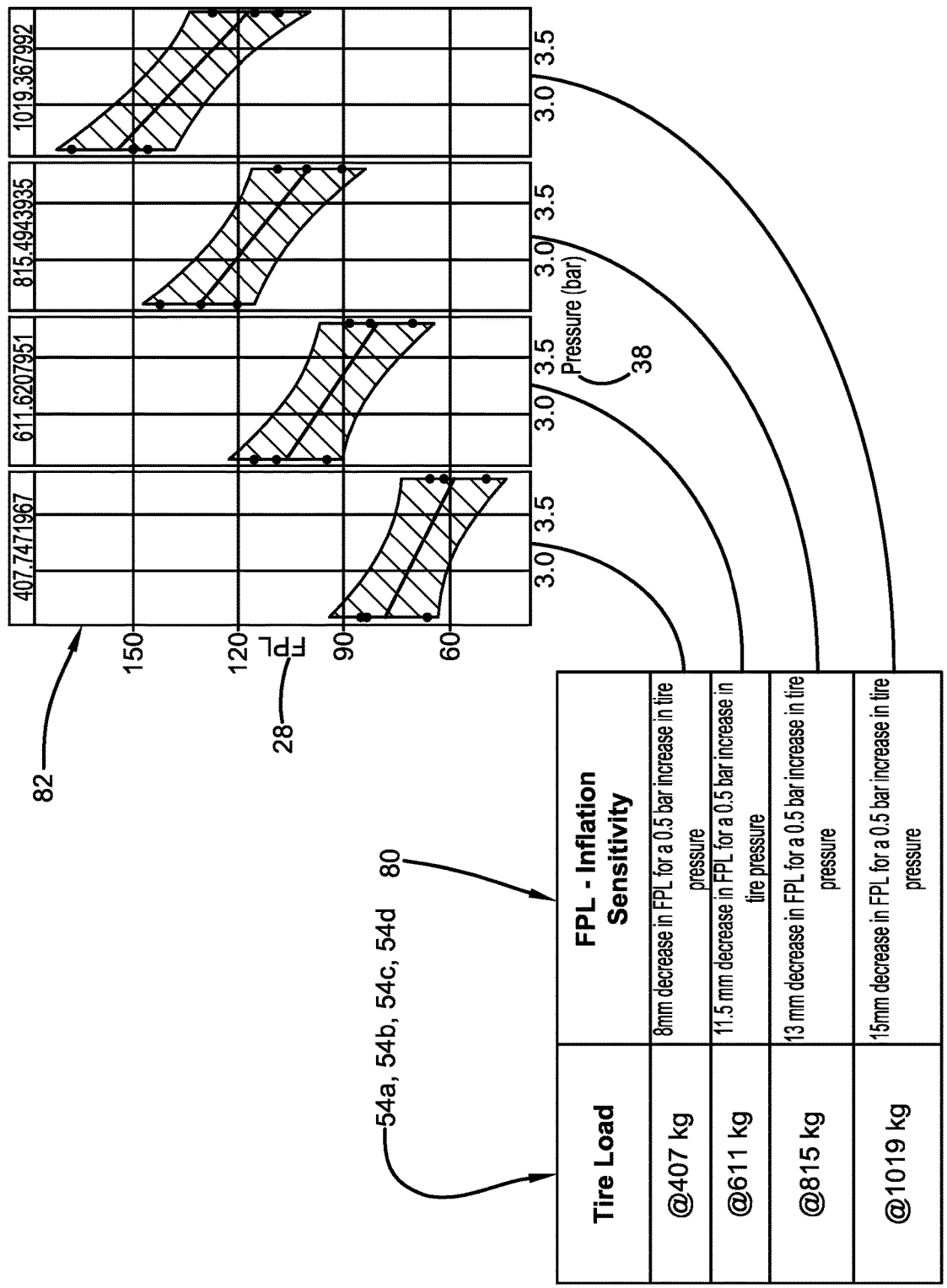
FIG. 7 is a graphical representation of another aspect of the auto-location system shown in FIG. 5.

Optionally, the system 10 may execute a pressure normalization of the tire footprint 32. More particularly, as shown in FIG. 7, when the load 54 is constant, the footprint 32 changes when the tire pressure 38 changes. When the footprint 32 changes, the measured footprint length 28 also changes. To compensate for this change, the system 10 may adjust the measure pressure 38 to a predetermined pressure value and obtain the corresponding pressure-normalized measured footprint length 28 and mean footprint length 60 for each tire 12. The pressure-normalized mean footprint lengths 60a, 60b, 60c, 60d can then be compared as described above.

Returning to FIG. 5, the position determination 100 may be wirelessly transmitted or communicated from the processor 40 to the display or controller device 50 and/or to the electronic control system 36 of the vehicle 14. Thus, the position determination 100 is accessible to a user of the vehicle 14 and/or a technician for the vehicle, and/or to a fleet manager. When the position determination 100 is transmitted to the electronic control system 36 of the vehicle 14, the position determination may be employed by various systems of the vehicle that are in communication with the electronic control system.

In this manner, the auto-location system 10 of the present invention employs measured footprint lengths 28 generated by tire sensor units 26 to determine mean footprint lengths 60 of each tire 12. Based upon the values of the mean footprint lengths 60, the system generates a position determination 100 to assign the tire sensor units 26 to respective tire positions on the vehicle 14. The auto-location system 10 thus provides economical and accurate identification of the location of the tires 12 on a vehicle 14, and incorporates an approach that is agnostic as to the vehicle platform and/or tire identification numbers, such as stock keeping unit (SKU) numbers.

The present invention also includes a method for locating the position of a tire 12 on a vehicle 14. The method includes steps in accordance with the description that is presented above and shown in FIGS. 1 through 7.

It is to be understood that the structure and method of the above-described auto-location system may be altered or rearranged, or components or steps known to those skilled in the art omitted or added, without affecting the overall concept or operation of the invention. For example, electronic communication may be through a wired connection or wireless communication without affecting the overall concept or operation of the invention. Such wireless communications include radio frequency (RF) and Bluetooth® communications. In addition, the system may be employed with vehicle types other than those described above, which may be supported by more or fewer tires than those described above, without affecting the overall concept or operation of the invention.

The invention has been described with reference to a preferred embodiment. Potential modifications and alterations will occur to others upon a reading and understanding of this description. It is to be understood that all such modifications and alterations are included in the scope of the invention as set forth in the appended claims, or the equivalents thereof.

What is claimed is:

1. An auto-location system, the system locating a position of a tire supporting a vehicle, the system comprising:
   a first tire sensor unit being mounted on a first tire, the first tire sensor unit including a first footprint length measurement sensor to measure a length of a footprint of the first tire, and electronic memory capacity to store an identification of the first tire sensor unit;
   a second tire sensor unit being mounted on a second tire, the second tire sensor unit including a second footprint length measurement sensor to measure a length of a footprint of the second tire, and electronic memory capacity to store an identification of the second tire sensor unit;
   a processor in electronic communication with the first and second tire sensor units;
   a vehicle status determination module in electric communication with the processor, the vehicle status determination module receiving the measured footprint length of the first tire and the measured footprint length of the second tire, and determining when the vehicle is in at least one of a static state and a cruising state;
   a mean calculation module in electric communication with the processor, the mean calculation module receiving the measured footprint length of the first tire and the measured footprint length of the second tire from the vehicle status determination module when the vehicle is in at least one of a static state and a cruising state, and determining a first mean footprint length corresponding to the first tire sensor unit and a second mean footprint length corresponding to the second tire sensor unit;
   a comparison module in electric communication with the processor, the comparison module receiving the first mean footprint length and the second mean footprint length, and determining a longest and a shortest of the first mean footprint length and the second mean footprint length; and
   a position determination module in electric communication with the processor, the position determination module generating a position determination of the first tire sensor unit and the second tire sensor unit based on the longest and the shortest of the first mean footprint length and the second mean footprint length.

2. The auto-location system of claim 1, wherein the position determination module determines a front tire position as corresponding to the longest of the first mean footprint length and the second mean footprint length.

3. The auto-location system of claim 1, wherein the position determination module determines a rear tire position as corresponding to the shortest of the first mean footprint length and the second mean footprint length.

4. The auto-location system of claim 1, further comprising:
   a third tire sensor unit measuring a footprint length of a third tire;
   a fourth sensor unit measuring a footprint length of a fourth tire;
   wherein the mean calculation module determines a third mean footprint length corresponding to the third tire sensor unit and a fourth mean footprint length corresponding to the fourth sensor unit; and wherein the comparison module determines a longest pair and a shortest pair of the first mean footprint length, the second mean footprint length, the third mean footprint length, and the fourth mean footprint length.

5. The auto-location system of claim 4, wherein the position determination module determines front tire positions as corresponding to the longest pair of the first mean footprint length, the second mean footprint length, the third mean footprint length, and the fourth mean footprint length.

6. The auto-location system of claim 4, wherein the position determination module determines rear tire positions as corresponding to the shortest pair of the first mean footprint length, the second mean footprint length, the third mean footprint length, and the fourth mean footprint length.

7. The auto-location system of claim 1, further comprising a receipt module in electric communication with the processor, the receipt module correlating the measured footprint lengths, the sensor unit identifications, and timestamps.

8. The auto-location system of claim 1, wherein the vehicle status determination module receives a vehicle signal to determine when the vehicle is in at least one of a static state and a cruising state.

9. The auto-location system of claim 8, wherein the vehicle signal includes at least one of a speedometer signal and an accelerometer signal.

10. The auto-location system of claim 1, wherein the mean calculation module receives multiple sets of measured footprint lengths for each tire sensor unit and determines a respective mean footprint length for each respective tire sensor unit from the multiple sets of measured footprint lengths.

11. The auto-location system of claim 1, further comprising a range review module in electric communication with the processor, the range review module including a predetermined range to screen for atypical vehicle conditions.

12. The auto-location system of claim 11, wherein the range includes predetermined measured footprint lengths.

13. The auto-location system of claim 12, wherein the position determination is discarded when at least one of the measured length of the footprint of the first tire and the measured length of the footprint of the second tire is outside the range.

14. The auto-location system of claim 11, wherein the range includes predetermined mean footprint lengths.

15. The auto-location system of claim 14, wherein the position determination is discarded when at least one of the first mean footprint length and the second mean footprint length is outside the range.

16. The auto-location system of claim 11, wherein the range includes a load of the vehicle.

17. The auto-location system of claim 16, wherein the position determination is discarded when the load of the vehicle is outside the range.

18. The auto-location system of claim 16, wherein the position determination is changed when the load of the vehicle is outside the range.

19. The auto-location system of claim 1, further comprising a pressure normalization of the footprint of the first tire and of the footprint of the second tire.

20. The auto-location system of claim 1, wherein the position determination is communicated to at least one of a display device, a controller device, and an electronic control system of the vehicle.

* * * * *